United States Patent
Shonk

(10) Patent No.: US 12,520,767 B2
(45) Date of Patent: Jan. 13, 2026

(54) THRESHING SYSTEM AND CHOPPER FOR COMBINE HARVESTER

(71) Applicant: CNH Industrial America LLC, New Holland, PA (US)

(72) Inventor: Jason L. Shonk, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 635 days.

(21) Appl. No.: 17/918,204

(22) PCT Filed: Apr. 7, 2021

(86) PCT No.: PCT/US2021/026091
§ 371 (c)(1),
(2) Date: Oct. 11, 2022

(87) PCT Pub. No.: WO2021/207296
PCT Pub. Date: Oct. 14, 2021

(65) Prior Publication Data
US 2023/0157210 A1  May 25, 2023

Related U.S. Application Data

(60) Provisional application No. 63/007,414, filed on Apr. 9, 2020.

(51) Int. Cl.
*A01F 7/06* (2006.01)
*A01F 12/18* (2006.01)

(52) U.S. Cl.
CPC .............. *A01F 7/067* (2013.01); *A01F 7/062* (2013.01); *A01F 12/185* (2013.01)

(58) Field of Classification Search
CPC ........ A01F 7/067; A01F 7/062; A01F 12/185; A01F 7/06
See application file for complete search history.

(56) References Cited

U.S. PATENT DOCUMENTS 2,677,550 A  5/1954  Berger et al.
3,995,645 A * 12/1976  Rowland-Hill ........... A01F 7/06
                                                           460/68

(Continued)

FOREIGN PATENT DOCUMENTS

| DE | 1264132 B * | 3/1968 | ............. A01F 12/40 |
| DE | 1582588 A1 * | 7/1970 | ............... A01F 7/06 |

(Continued)

OTHER PUBLICATIONS

International Search Report and Written Opinion for PCT Application No. PCT/US2021/026091 dated Jul. 19, 2021 (15 pages).

*Primary Examiner* — Arpad Fabian-Kovacs
(74) *Attorney, Agent, or Firm* — Buchanan Ingersoll & Rooney PC

(57) ABSTRACT

A combine (20) harvester includes a cage (32') at least partially surrounding a rotor (28') for threshing crops in the space (34) between the cage (321) and the rotor (28'). An auger (302) is at least partially positioned within the cage (32') and is connected to the rotor (28') for rotating therewith. The auger (302) includes vanes (312) for transporting crop from the rotor (28') and towards an outlet of the cage (32'). A chopper (320) is positioned either at or adjacent the outlet (310) of the cage (32'). A rotational axis (30) of the chopper (320) is substantially aligned with an axis of rotation of the auger (302) and the rotor (28').

20 Claims, 3 Drawing Sheets

(56) References Cited

U.S. PATENT DOCUMENTS

| | | | |
|---|---|---|---|
| 4,186,753 A | | 2/1980 | Todd |
| 4,198,802 A | * | 4/1980 | Hengen ............... A01F 7/06 |
| | | | 460/80 |
| 4,249,542 A | | 2/1981 | Schuler |
| RE31,257 E | * | 5/1983 | Glaser ............... A01F 12/24 |
| | | | 460/80 |
| 5,913,724 A | * | 6/1999 | Roberg ............ A01F 12/40 |
| | | | 460/71 |
| 5,928,079 A | * | 7/1999 | Roberg ............ A01F 12/40 |
| | | | 460/83 |
| 6,027,407 A | * | 2/2000 | Roberg ............ A01F 12/40 |
| | | | 460/71 |
| 6,152,820 A | | 11/2000 | Heidjann et al. |
| 6,976,912 B2 | * | 12/2005 | Gribbin ............... A01F 7/06 |
| | | | 460/69 |
| 7,618,311 B2 | | 11/2009 | Diekhans |
| 7,717,777 B2 | * | 5/2010 | Pope ............... A01F 7/067 |
| | | | 460/69 |
| 8,075,377 B2 | * | 12/2011 | Pope ............... A01F 7/067 |
| | | | 460/66 |
| 2005/0043071 A1 | | 2/2005 | Gribbin |
| 2021/0084823 A1 | * | 3/2021 | Chen ............... A01F 12/442 |

FOREIGN PATENT DOCUMENTS

| | | | | |
|---|---|---|---|---|
| DE | 2943840 C2 | * | 7/1990 | ............ A01F 7/06 |
| DE | 3917818 A | * | 12/1990 | ............ A01D 41/00 |
| DE | 10350123 B3 | | 1/2005 | |
| EP | 0124628 A1 | | 11/1984 | |
| EP | 0748583 A1 | * | 12/1996 | ............ A01F 12/40 |
| JP | 2008054572 A | | 3/2008 | |
| SU | 670275 A | | 6/1979 | |
| WO | WO-2013188398 A1 | * | 12/2013 | ............ A01F 7/06 |

\* cited by examiner

THRESHING SYSTEM AND CHOPPER FOR COMBINE HARVESTER

FIELD OF THE INVENTION

The present invention relates to a threshing system and chopper for a combine harvester.

BACKGROUND OF THE INVENTION

As is described in U.S. Pat. No. 8,092,286 to CNH America LLC (the '286 Patent), which is incorporated by reference in its entirety and for all purposes, in the operation of a typical agricultural combine that employs a threshing rotor, the flow of crop residue remaining after threshing, sometimes referred to as material other than grain (MOG), is typically discharged into a crop residue treatment and distribution system for treatment thereby and for ultimate distribution onto or over a field. Straw and residue chopper assemblies and residue spreader assemblies of various types and constructions have long been in use in or with such residue treatment and distribution systems. Such assemblies chop or pulverize the crop residue resulting from a harvesting operation into finer pieces and/or to spread the resulting crop residue, whether chopped into finer pieces by operation of a chopper assembly or passed to the spreader assembly as larger pieces of residue, onto and over the field. Operators seek to vary the cut length and chop quality of the MOG based upon the crop being harvested and the desired residue management practice. Described herein is a threshing system and chopper that enables operators to vary the cut length and chop quality.

SUMMARY OF THE INVENTION

According to one aspect of the invention, a combine harvester comprises a cage at least partially surrounding a rotor for threshing crops in a space between the cage and the rotor; an auger at least partially positioned within the cage and connected to said rotor for rotating therewith, said auger comprising vanes for transporting crop in a transport direction from the rotor and towards an outlet of the cage; and a chopper positioned either at or adjacent the outlet of the cage, wherein a rotational axis of the chopper is substantially aligned with an axis of rotation of the auger and the rotor.

According to another aspect of the invention, a combine harvester comprises a cage at least partially surrounding a rotor for threshing crops in a space between the cage and the rotor; an auger at least partially positioned within the cage and connected to said rotor for rotating therewith, said auger comprising vanes for transporting crop in a transport direction from the rotor and towards an outlet of the cage, wherein the auger has a body and vanes extending from an exterior surface of the body, and wherein a height of the vanes decreases in the transport direction, a pitch of the vanes increases in the transport direction, and a volume space disposed between adjacent convolutions of the vanes is substantially constant in the transport direction; and a chopper positioned either at or adjacent the outlet of the cage.

According to yet another aspect of the invention, a combine harvester comprises: a cage at least partially surrounding a rotor for threshing crops in a space between the cage and the rotor; a chopper positioned either at or adjacent an outlet of the cage, wherein a rotational axis of the chopper is substantially aligned with an axis of rotation of the rotor; and means for driving the chopper at a different rate of rotation than a rate of rotation of the rotor.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
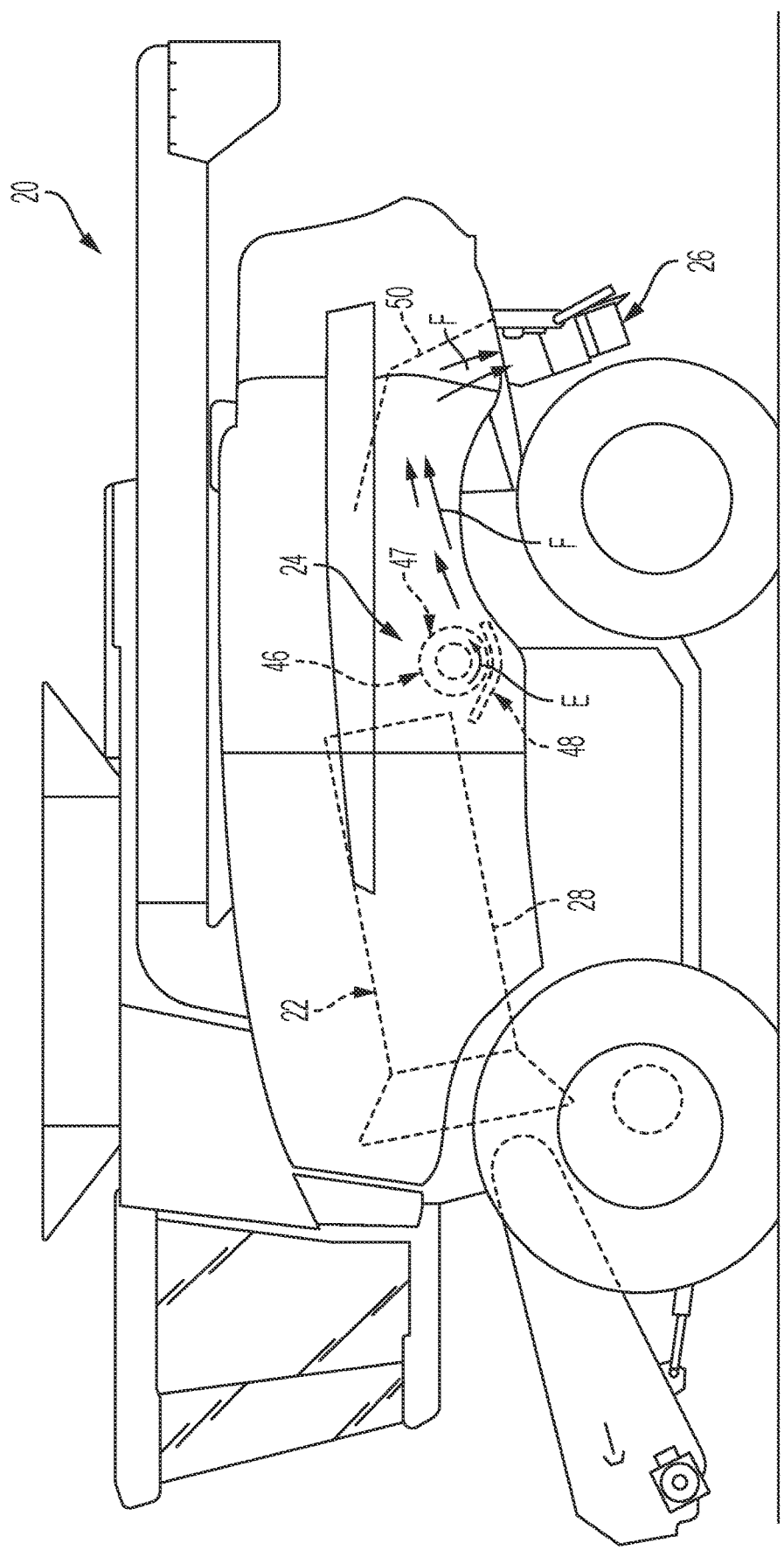
FIG. 1 is a simplified side plan view of an agricultural combine, illustrating, in dotted outline, an axially arranged threshing system of the combine and an integral chopper assembly of the residue treatment and distribution system of the combine.

Corresponding reference characters indicate corresponding parts throughout the several views. The exemplification set out herein illustrates an embodiment of the invention, in one form, and such exemplification is not to be construed as limiting the scope of the invention in any manner.

For convenience of reference and understanding in the following discussions, and with respect to the various drawings and their descriptions, the point of reference for the use of various terms that are hereafter employed, including "left", "right", "forward", "rearward", "front", "back", "top", and "bottom", should generally be considered to be taken from a point at the rear of the combine harvester machine facing in its normal direction of travel, unless it is clear from the discussion and context that a different point of reference is appropriate. Any use of such terms should therefore be considered exemplary and should not be construed as limiting or introducing limitations.

Moreover, inasmuch as various components and features of harvesters and fan assemblies are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

Figure 2:
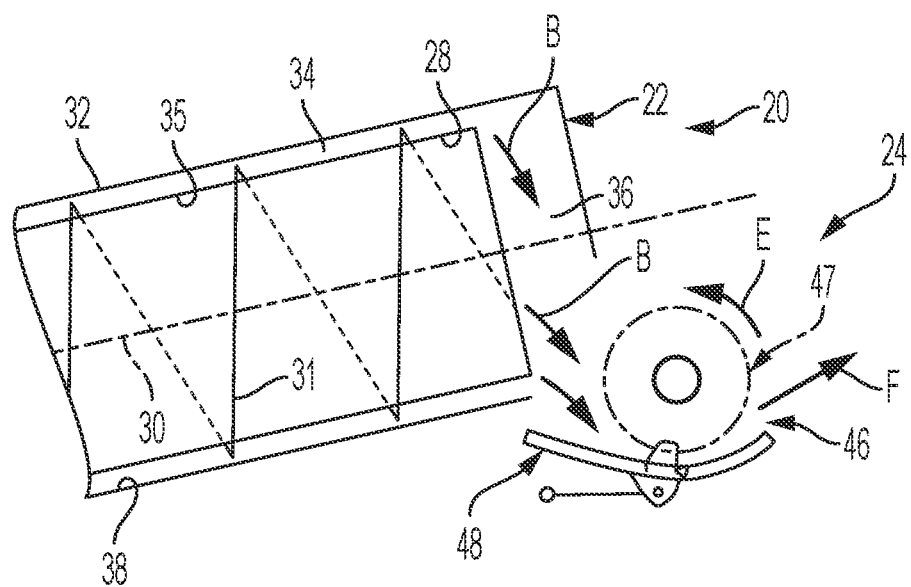
FIG. 2 is a simplified side plan view of the threshing system and a portion of the crop residue treatment and distribution system of the combine of FIG. 1, further illustrating the flow of crop residue to and through the integral chopper assembly.

FIGS. 1 and 2 depict a representative agricultural combine 20 that includes a longitudinally axially arranged threshing system 22 and a crop residue treatment and distribution system 24 with a crop residue spreader 26, all of which, are of well-known construction and operation. Threshing system 22 is axially arranged in that it includes a cylindrical threshing rotor 28 that is conventionally supported and rotatable in a predetermined, typically clockwise direction, about a rotational axis 30 therethrough and within a concave 32 (FIG. 2), for conveying a flow of crop material in a helical flow path through a space 34 extending circumferentially around an outer cylindrical surface 35 of rotor 28 and an inner circumferential surface 38 of concave 32. Rotor 28 has a set of helical vanes 31 on its exterior surface, as shown. As the crop material is moved through space 34, the crop, such as grain, legumes, or the like, will be loosened and separated from crop residue such as husk and pods, and carried away therefrom in the well-known conventional manner.

As may be best illustrated by FIG. 2, the crop residue will continue along a helical path through space 34, and will be expelled therefrom, as denoted by arrows B, into and through a discharge opening and passage 36, which essentially comprises an extension of space 34 at the downstream end of threshing rotor 28. The consistency of the flow of crop residue, volume thereof, and extent or pattern thereof, will typically vary, and be a function of a variety of conditions, including, but not limited to, the speed of rotation of rotor 28, crop type, plant maturity, moisture content, and weather conditions. As an example, rotor speeds can vary between just a few hundred RPM and over 1000 RPM. Wheat and other small grains will typically have relatively small crop residue components, whereas other grains, such as corn, will typically have larger components, such as thick stalk segments, cob fragments, and large leaves.

Crop residue treatment and distribution system 24 includes a transport and chopping assembly, such as integral chopper assembly 46, sometimes hereinafter referred to as rotary assembly 46 having a rotary chopper element 47 rotatable in a direction E above a concave pan assembly such as chopper grate assembly 48. Rotary chopper element 47 typically rotates at a rapid speed, so as to be capable of accelerating and propelling a flow of crop residue rearwardly within the confines of the rear end of combine 20, as generally denoted by arrows F. Such rearward flow is typically guided and directed by internal panels or shields, generally denoted by shields 50 (FIG. 1), so as to either flow through a rear opening so as to be deposited directly onto a field, such as in a windrow, or flow into a secondary crop residue chopper and/or spreader, such as chopper/spreader 26, for spreading thereby in a swath on the field. Further details of combine 20 are described in the '286 Patent.

Figure 3:
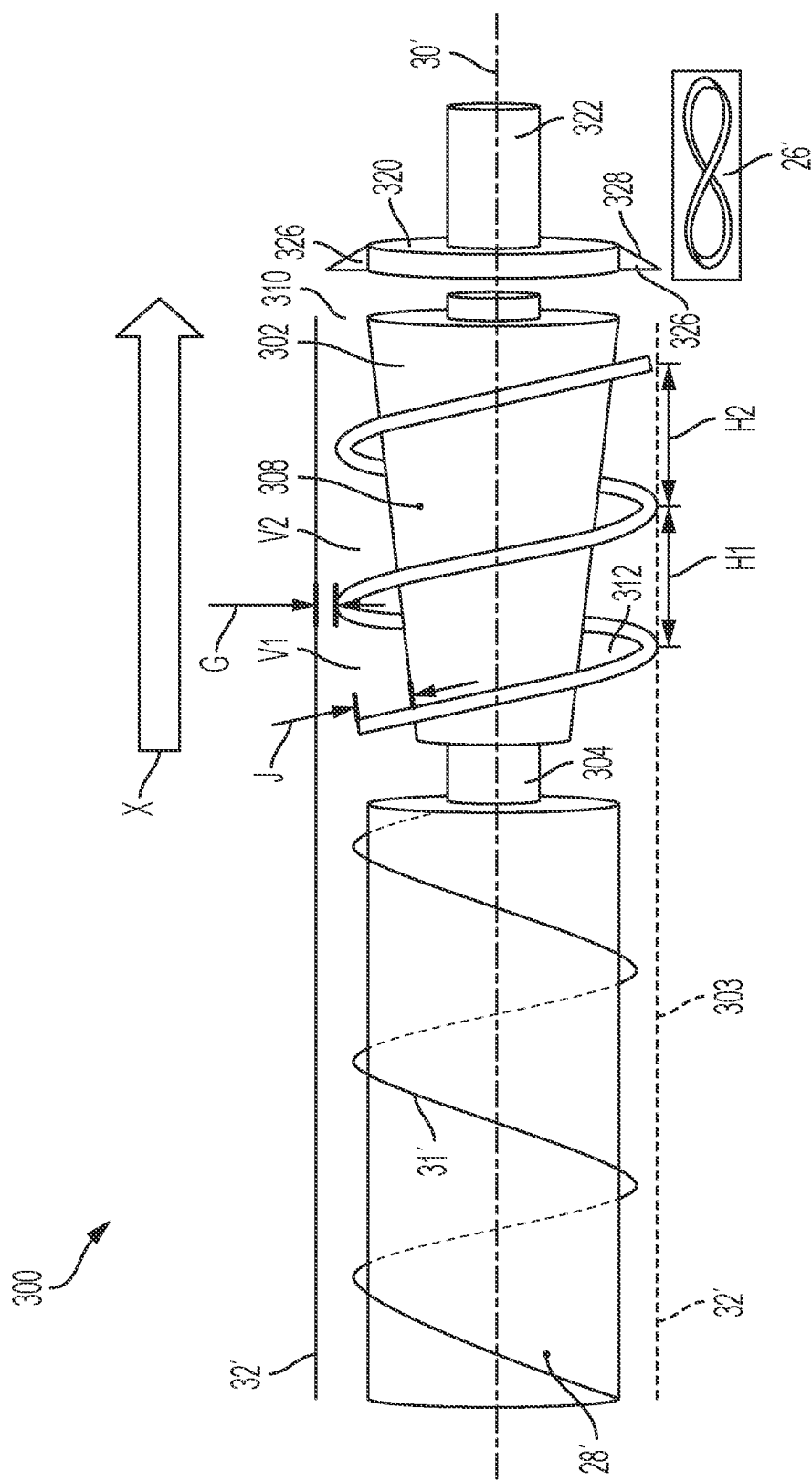
FIG. 3 is a schematic block diagram of a threshing system and a portion of a crop residue treatment and distribution system according to an exemplary embodiment.

Turning now to FIG. 3, that figure depicts a schematic block diagram of a threshing system and a portion of a crop residue treatment and distribution system according to an exemplary embodiment. The threshing system and crop residue treatment and distribution system are referred to generally herein as "systems 300." It is noted at the outset that the systems 300 of FIG. 3 differ from those systems of FIGS. 1 and 2, however, the systems 300 of FIG. 3 may be incorporated into the combine 20 of FIGS. 1 and 2.

More particularly, systems 300 includes an extended cylindrical cage 32' (the prime designation indicating that the cage 32' corresponds to the concave 32 of FIG. 1) defining a hollow interior region in which a rotor 28' and an auger 302 are positioned. Cage 32' may be one continuous cylinder, as shown, or, alternatively, cage 32' may represent multiple parts that are fixedly mounted together along axis 30'. Cage 32' comprises a concave, and the concave includes a series of openings 303 that are disposed beneath rotor 28' and (optionally) auger 302. In operation, threshed grain falls through openings 303 and onto sieves (not shown).

Rotor 28' and auger 302 are non-rotatably connected together by a shaft 304; non-rotatably meaning that rotor 28' and auger 302 rotate together in the same rotational direction. Rotor 28' has helical vanes 31' for moving crop material in the direction of arrow X in FIG. 3. Arrow X depicts the transport direction of MOG through cage 32'.

Auger 302 has a frustoconical body 308 in which the small diameter end is positioned adjacent rotor 28' and the large diameter end is positioned at or near the outlet opening 310 of cage 32'. Helical vanes 312 extend transversely from the exterior surface of auger 302. The geometry of vanes 312 differs from that of vanes 31'. The auger 302 is configured to gradually compressed and reduces the thickness or depth of MOG as it travels in the direction of arrow X.

The height of vanes 312, as measured from the exterior surface of auger 302, decreases in the transport direction of arrow X (i.e., in the direction of crop flow through cage 32'). The gap 'G' between the terminal end of the vanes 312 and the interior surface of cage 32' remains substantially constant along the length of auger 302 that extends along axis 30'. The lateral distance (i.e., pitch) separating adjacent convolutions of vanes 312, in which MOG is carried, increases in the direction of arrow X such that distance H2 is greater than H1 by a predetermined amount. Distances H1 and H2 may be measured from the crests of vanes 312. Specifically, the lateral distance separating adjacent convolutions of vanes 312 and height of vanes 312 are set such that the volume (V1, V2) of space between adjacent convolutions of vanes 312 remains substantially constant along the length of (direction X) of auger 302.

In lieu of a rotary chopper 57, systems 300 include a chopper 320 that is rotatably driven about axis 30' by a motor 322, for example. Unlike chopper 57, the axis of rotation of chopper 320 is aligned and coextensive with the axis of rotation 30' of rotor 28'. Chopper 320 rotates independently of rotor 28' and auger 302. According to one aspect, the rate of rotation of chopper 320 is greater than that of rotor 28' and auger 302. Motor 322 may be hydrostatic, hydraulic, chain, belt or gear driven, for example. Motor 322 may be referred to herein as a means for driving the chopper 320. It should be understood that chopper 320 may be driven by any device that is known to those skilled in the art. Also, in lieu of motor 322, chopper 320 could be non-rotatably connected to shaft 304 along with rotor 28' and auger 302.

Chopper 320 has a cylindrical body, and a series of paddles or knife blades 326 are mounted about the circumference of body of chopper 320. A series of mounting points, such as threaded holes, for example, are disposed on the circumference of chopper 320. Each mounting point is configured to releasably receive a knife blade 326. The operator of the combine can fasten the knife blades 326 to the chopper 320 at select locations along the circumference of chopper 320 to achieve a desired cut length for the MOG. In other words, adjusting the circumferential spacing of the knife blades 326, varies the cut length for the MOG. The operator can also adjust the cut length for the MOG by varying the rotational speed of chopper 320. Thus, in summary, the operator can adjust the cut length for the MOG by varying the rotational speed of chopper 320 and/or the number of knifes blade 326 that are mounted on the chopper 320. The maximum diameter of the chopper 320 (including knife blades 326) is substantially equivalent to the internal diameter of cage 32' or the maximum diameter of auger 302.

Each knife blade 326 includes an angled or curved surface 328 at the downstream end so as to induce suction or vacuum in the direction of arrow X during rotation of chopper 320, thereby drawing MOG outside of cage 32'. A spreader 26' is positioned at the outlet of chopper 326 for directing the MOG outside of combine, as is known in the art.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A combine harvester comprising:
   a cage;
   a rotor for threshing crops in a space between the cage and the rotor, the rotor being at least partially surrounded by the cage, said rotor comprising rotor vanes for transporting crop in a transport direction towards an outlet of the cage;
   an auger at least partially positioned within the cage and non-rotatably connected to said rotor by a shaft for rotating with the rotor, said auger comprising auger vanes for transporting crop in the transport direction from the rotor and towards the outlet of the cage; and
   a chopper positioned either at or adjacent the outlet of the cage, wherein a rotational axis of the chopper is substantially aligned with an axis of rotation of the auger and the rotor.

2. The combine harvester of claim 1, wherein the auger has a body and the auger vanes extend from an exterior surface of the body.

3. The combine harvester of claim 2, wherein a height of the auger vanes decreases in the transport direction, wherein a pitch of the auger vanes increases in the transport direction, and wherein a volume space disposed between adjacent convolutions of the auger vanes is substantially constant in the transport direction.

4. The combine harvester of claim 1, wherein the cage includes a concave disposed beneath the rotor, and wherein the cage includes openings disposed beneath both the rotor and the auger.

5. The combine harvester of claim 1, wherein the chopper includes a body and knife blades extending from the body, and wherein the knife blades are releasably mounted to a body of the chopper.

6. The combine harvester of claim 1, further comprising means for driving the chopper, and wherein the means are configured for driving the chopper at a different rate of rotation than a rate of rotation of the auger and the rotor.

7. The combine harvester of claim 1 further comprising a spreader positioned at an output of the chopper.

8. The combine harvester of claim 1, wherein the rotor has a cylindrical shaped body and the rotor vanes extend from the cylindrical shaped body, and wherein the auger has a frustoconical shaped body and the auger vanes extend from the frustoconical shaped body.

9. The combine harvester of claim 1, wherein a downstream end of the rotor is spaced apart in an axial direction from an upstream end of the auger by a gap and the shaft extends along the gap.

10. The combine harvester of claim 1, wherein the auger vanes are non-continuous with the rotor vanes.

11. A combine harvester comprising:
    a cage;
    a rotor for threshing crops in a space between the cage and the rotor, the rotor being at least partially surrounded by the cage, said rotor comprising rotor vanes for transporting crop in a transport direction towards an outlet of the cage;
    an auger at least partially positioned within the cage and non-rotatably connected to said rotor by a shaft for rotating with the rotor, said auger comprising auger vanes for transporting crop in the transport direction from the rotor and towards the outlet of the cage, wherein the auger has a body and the auger vanes extend from an exterior surface of the body, and wherein a height of the auger vanes decreases in the transport direction, a pitch of the auger vanes increases in the transport direction, and a volume space disposed between adjacent convolutions of the auger vanes is substantially constant in the transport direction; and
    a chopper positioned either at or adjacent the outlet of the cage.

12. The combine harvester of claim 11, wherein a rotational axis of the chopper is substantially aligned with an axis of rotation of the auger.

13. The combine harvester of claim 11, wherein the chopper includes a body and knife blades extending from the body, and wherein the knife blades are releasably mounted to the body of the chopper.

14. The combine harvester of claim 11, further comprising means for driving the chopper, wherein the means are configured for driving the chopper at a different rate of rotation than a rate of rotation of the auger and the rotor.

15. The combine harvester of claim 11, wherein the rotor has a cylindrical shaped body and the rotor vanes extend from the cylindrical shaped body, and wherein the auger has a frustoconical shaped body and the auger vanes extend from the frustoconical shaped body.

16. The combine harvester of claim 11, wherein a downstream end of the rotor is spaced apart in an axial direction from an upstream end of the auger by a gap and the shaft extends along the gap.

17. The combine harvester of claim 11, wherein the auger vanes are non-continuous with the rotor vanes.

18. A combine harvester comprising:
    a cage;
    a rotor for threshing crops in a space between the cage and the rotor, the rotor being at least partially surrounded by the cage, said rotor comprising rotor vanes for transporting crop in a transport direction towards an outlet of the cage;
    an auger at least partially positioned within the cage and non-rotatably connected to said rotor by a shaft for rotating with the rotor, said auger comprising auger vanes for transporting crop in a transport direction from the rotor and towards the chopper, and said rotor including rotor vanes that are non-continuous with said auger vanes;
    a chopper positioned either at or adjacent the outlet of the cage, wherein a rotational axis of the chopper is substantially aligned with an axis of rotation of the rotor; and
    means for driving the chopper at a different rate of rotation than a rate of rotation of the rotor.

19. The combine harvester of claim 18, wherein the rotor has a cylindrical shaped body and the rotor vanes extend from the cylindrical shaped body, and wherein the auger has a frustoconical shaped body and the auger vanes extend from the frustoconical shaped body.

20. The combine harvester of claim 18, wherein a downstream end of the rotor is spaced apart in an axial direction from an upstream end of the auger by a gap and the shaft extends along the gap.

\* \* \* \* \*